United States Patent [19]
Breen et al.

[11] Patent Number: 5,078,064
[45] Date of Patent: Jan. 7, 1992

[54] APPARATUS AND METHOD OF LOWERING NOX EMISSIONS USING DIFFUSION PROCESSES

[75] Inventors: Bernard P. Breen; Steven E. Winberg, both of Pittsburgh, Pa.; James E. Gabrielson, Plymouth, Minn.; James C. McMichael, Monroeville, Pa.

[73] Assignee: Consolidated Natural Gas Service Company, Inc., Pittsburgh, Pa.

[21] Appl. No.: 623,782

[22] Filed: Dec. 7, 1990

[51] Int. Cl.$^5$ ............................ F23B 5/00; F23C 9/00; F23G 7/06
[52] U.S. Cl. .................................. 110/212; 110/345; 422/182; 422/183
[58] Field of Search ............... 110/212, 213, 214, 345, 110/344, 342; 422/182, 183

[56] References Cited
U.S. PATENT DOCUMENTS

| | | | |
|---|---|---|---|
| 4,368,677 | 1/1983 | Kline | 110/212 |
| 4,597,342 | 7/1986 | Green | 110/347 |
| 4,779,545 | 10/1988 | Breen et al. | 110/212 |
| 4,790,743 | 12/1988 | Leikert et al. | 431/8 |
| 4,974,530 | 12/9990 | Lyon | 110/212 X |

OTHER PUBLICATIONS
European Patent Application No. 0 280 568 to Masai.

Primary Examiner—Edward G. Favors
Attorney, Agent, or Firm—Buchanan Ingersoll

[57] ABSTRACT

An apparatus and method for reducing nitrogen oxide emissions from furnace flue gas is provided in which natural gas or other fluid fuel which has little or no fixed nitrogen is introduced into the upper portion of the furnace. The fuel diffuses by laminar or turbulent diffusion into oxygen-rich flue gas where it reacts with oxygen and nitric oxide to form $CO_2$, $H_2O$ and $N_2$, thus reducing the nitrogen oxide emissions from the furnace. In this manner, the amount of nitrogen oxide in the flue gas is reduced. The apparatus and method can be easily applied to new furnaces or retrofitted on existing furnaces.

40 Claims, 3 Drawing Sheets

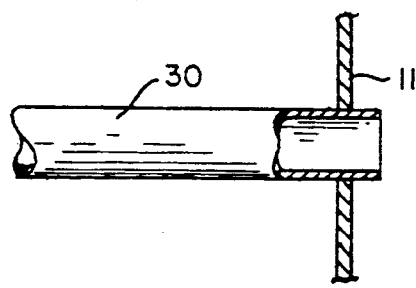
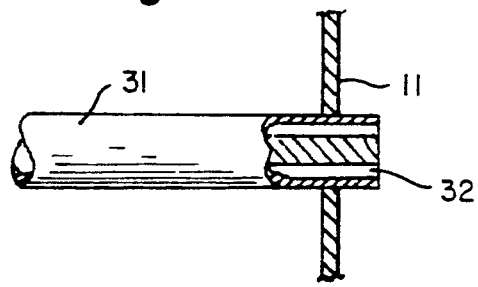
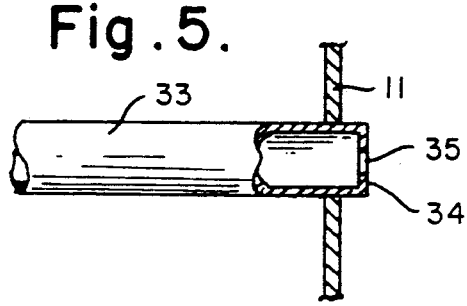
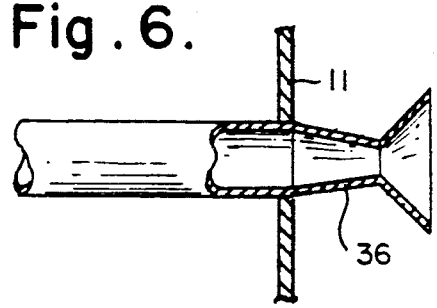
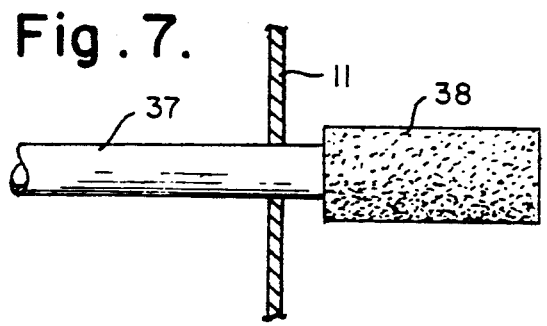
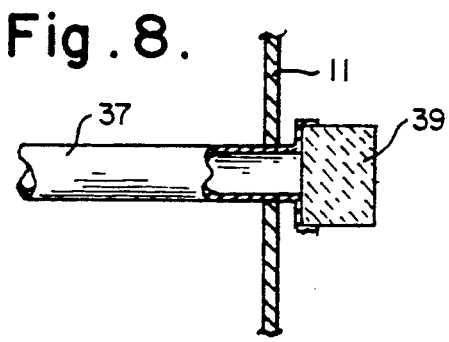
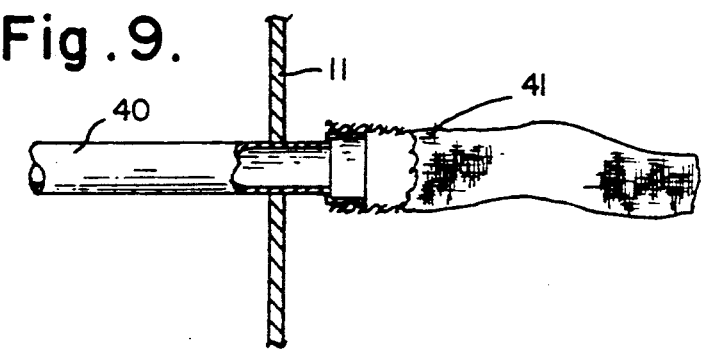

APPARATUS AND METHOD OF LOWERING NOX EMISSIONS USING DIFFUSION PROCESSES

BACKGROUND OF THE INVENTION

1. Field of the Invention

The present invention relates to an apparatus and method for in-furnace reduction of nitrogen oxide emissions in flue gas.

In the combustion of fuels with fixed nitrogen such as coal, oxygen from the air may combine with the fixed nitrogen to produce nitrogen oxides. At sufficiently high temperatures, oxygen reacts with atmospheric nitrogen to form nitrogen oxides. Production of nitrogen oxide is regarded as undesirable. There are numerous government regulations which limit the amount of nitrogen oxide which may be emitted from a combustion furnace. Furthermore, the presence of nitrogen oxide in a furnace flue gas causes the condensates formed from the gases to be more corrosive and acidic. Consequently, there is a need for apparatus and processes which reduce the nitrogen oxide emissions in furnace flue gas.

2. Description of the Prior Art

Numerous attempts have been made to develop apparatus and processes which reduce the nitrogen oxide emissions in a furnace flue gas. One such approach is a process known as in-furnace nitrogen oxide reduction, reburning, or fuel staging. In reburning, coal, oil, or natural gas is injected above the normal flame zone to form a fuel-rich zone. In this zone, part of the nitrogen oxides are reduced to ammonia- and cyanide-like fragments which are then oxidized to form $N_2$ and nitrogen oxide.

Several problems occur when this process is used. First, coal may be an inefficient reburn fuel because of its high fixed-nitrogen composition. The fixed nitrogen introduced at this location in the furnace will have less chance of being converted to $N_2$, and therefore have a higher chance of ending up as nitrogen oxide and may, depending on the nitrogen oxide concentration of the flue gas, increase the emissions of nitrogen oxide.

Furthermore, the fuel must be injected with a sufficient volume of gas. If air is used as this gas, there must be enough fuel to consume the oxygen in the flue gas and air, and to supply an excess of fuel so reducing conditions exist. This increases the amount of fuel which must be used as reburn fuel. Furthermore, the necessity of using carrier air requires extensive duct work in the upper part of the furnace.

Additionally, the reburn fuel must be injected well above the primary combustion zone of the furnace so that it will not interfere with the reactions taking place therein. However, this fuel must be made to burn out completely without leaving a large amount of unburned carbon. To do this, the fuel must be injected in a very hot region of the furnace some distance from the furnace exit. The exit temperature of the furnace must be limited in order to preserve the heat exchanger's surface. Therefore, a tall furnace is required to complete this second stage process.

Moreover, the fuel must be injected in such quantities as to make the upper furnace zone fuel rich. This fuel is supplied in excess of the amount of air in the furnace and ultimately requires more air in order to be completely combusted. Thus, air must be injected above the reburn fuel injection. This requires even more duct work and furnace volume.

Finally, most coal furnaces which are now in operation are not designed to accommodate the prior art methods. Major modifications such as the provision of extensive duct work and the addition of a second stage to the process are required to utilize the prior art method. Such retrofitting is expensive. Consequently, there is a need for a combustion apparatus and process which will reduce nitrogen oxide emissions in flue gas and which can be readily used in existing furnaces.

In U.S. Pat. No. 4,779,545, a reburn process wherein natural gas is introduced in the upper furnace through pulse combustors is described. This process does not require any make-up air to reduce $NO_x$ emissions. However, it does require pulse combustors, the installation and operation of which is costly. There remains a need for an improved process for the in-furnace reduction of nitrogen oxides.

In U.S. Pat. No. 4,779,545, the inventors teach that nitrogen oxide emissions can be reduced by introducing fuel into the upper furnace in discrete pulses which generate fuel-rich pockets. In these zones, part of the nitrogen oxide is reduced to $N_2$ and part to $NH_3$, $NH_i$, and other reduced nitrogen species. As the fuel-rich zones mix with the remainder of the flue gas, the reduced nitrogen species react with more nitrogen oxides to form $N_2$.

The process of U.S. Pat. No. 4,779,545 requires sufficient time for the formation of fuel-rich pockets, the mixing and chemical reactions within the pockets, and the out mixing followed by the next set of reactions. Careful control or selection of chemical ratios, temperatures, times, and turbulence is required.

Our invention depends only upon the diffusion of the fuel into the combustion products. A two-step process is not required.

SUMMARY OF THE INVENTION

In accordance with the present invention, we provide an improved apparatus and process for reducing the nitrogen oxide emissions in furnace flue gas. A combustible fluid such as natural gas is introduced into the upper furnace through pipes, nozzles, orifices, diffusers, porous ceramic bodies, ceramic socks, or other suitable devices. These fuel introducing devices are driven only by the pressure of the fuel, and the fuel as it is expelled into the furnace diffuses into the combustion products from the furnace. The fuel gas as it diffuses into the flue gas reacts therewith to $CO_2$ and water vapor and it reacts with $NO_x$ to form $N_2$. Reduction of over 95% of the $NO_x$ has been measured.

Experimental work has shown that NO can be destroyed under overall fuel-lean conditions. This surprising result allows $NO_x$ reduction without the necessity of even localized fuel-rich conditions. Fuel-rich and oxygen-rich jets were impinged on each other to form a laminar opposed jet diffusion flame. As the jets impinge on each other, a thin reaction zone forms between them. The NO was introduced into the oxygen-rich jet. Reductions of up to 50% of the NO were achieved. Table 1 shows the results which are also plotted in FIG. 1 as dots.

TABLE 1

| | NO Reduction when NO is Mixed with Oxygen Rich Gas | |
|---|---|---|
| Test | Initial NO, as ppm of total gas | Final NO as ppm of total gas |
| 1 | 0 | 20 |
| 2 | 130 | 130 |
| 3 | 580 | 310 |
| 4 | 1000 | 480 |

In Test 1, no nitrogen oxide was introduced with the oxidizer and 20 ppm was produced during the reaction; this result was not surprising. In Test 2, no change in the nitrogen oxide occurred; and this result, starting from a modest amount of NO, was not surprising. In Test 3 where 580 ppm of NO was reduced to 310 ppm, and in Test 4 where 1000 ppm of NO was reduced to 480 ppm, the results were positive and better than expected.

A second set of experiments was conducted in which the NO was introduced as concentrated NO at the center line of the impinging jets. The NO readings were 20 to 40 ppm independently of the amount of NO introduced. Surprisingly, this set of experiments shows that when the NO is actually brought to the reacting interface between air-rich and fuel-rich streams it can be expected to approach very close to the equilibrium value. Table 2 shows the results which are plotted in FIG. 1 as circles.

TABLE 2

| Test | Initial NO, as ppm of total gas | Final NO as ppm of total gas |
|---|---|---|
| 5 | 80 | 20 |
| 6 | 190 | 25 |
| 7 | 210 | 20 |
| 8 | 450 | 40 |
| 9 | 620 | 20 |
| 10 | 910 | 30 |

From these results it can be seen that when fuel is introduced into flue gas at a place in the furnace where the resulting combustion temperature is low, the NO in the flue gas will be reduced; very large reductions can be achieved. The necessary apparatus may be introduced at any suitable point in the air intake circuit. Through such apparatus we introduce into the secondary air stream natural gas or other gases or volatile fuels having little or no fixed nitrogen. The resulting fuel/air mixture does not have enough fuel to burn at ambient temperatures. However, as it mixes with flames in the furnace or hot gases from the primary flames, the fuel so introduced will burn. Much of it burns at temperatures well below the peak flame temperature.

Because of the simplicity of this system, it is well-suited for retrofitting existing coal furnaces. Because the process relies only on natural mixing, there is no need for an air addition stage. Because natural gas burns more rapidly at a lower temperature than coal, the fuel can be introduced at a higher elevation and lower temperature. This lower temperature acts to reduce the equilibrium level of nitrogen oxide in the flue gas and, hence, increases the nitrogen oxide reduction possible. Finally, duct work is not necessary for injection air nor for completion air. As a consequence, the cost of reducing the nitrogen oxide emissions in the flue gas is greatly reduced. Other objects and advantages of the invention will become apparent as a description of the preferred embodiments proceeds.

BRIEF DESCRIPTION OF THE DRAWINGS

FIG. 3 is a side view partially in section of a a fuel injection pipe which can be used in the furnace of FIG. 2.

FIG. 4 is a side view partially in section of a fuel injector with an annular opening which can be used in the furnace of FIG. 2.

FIG. 5 is a side view partially in section of an orifice which can be used in the furnace of FIG. 2.

FIG. 6 is a side view partially in section of a converging-diverging nozzle which can be used in the furnace of FIG. 2.

FIG. 7 is a side view of a metallic fuel diffuser which can be used in the furnace of FIG. 2.

FIG. 8 is a side view partially in section of a ceramic fuel diffuser which can be used in the furnace of FIG. 2.

FIG. 9 is a side view partially in section of a fiberglass or ceramic sock which can be used in the furnace of FIG. 2.

DESCRIPTION OF THE PREFERRED EMBODIMENT

Figure 1:
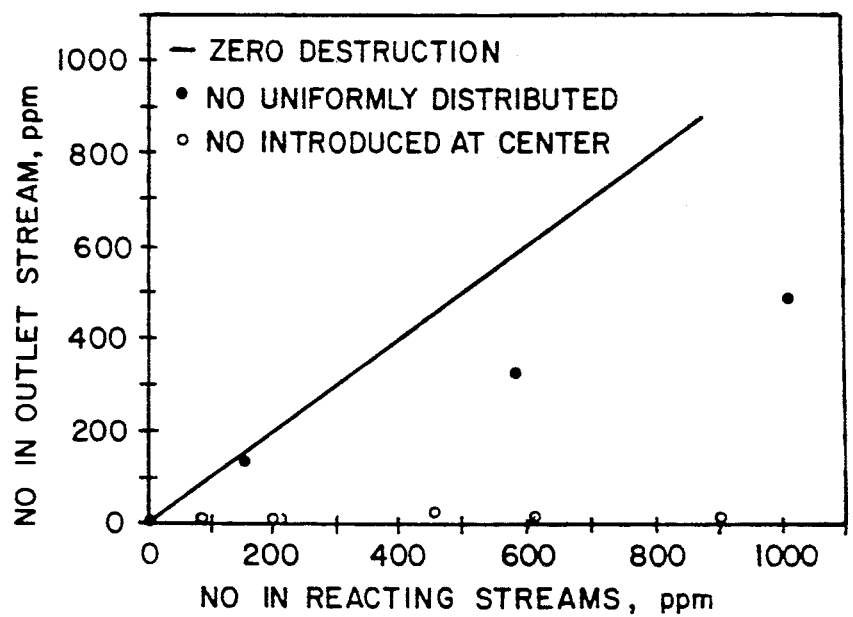
FIG. 1 is a graph of NO destruction in fuel-lean laminar diffusion flames.
Figure 2:
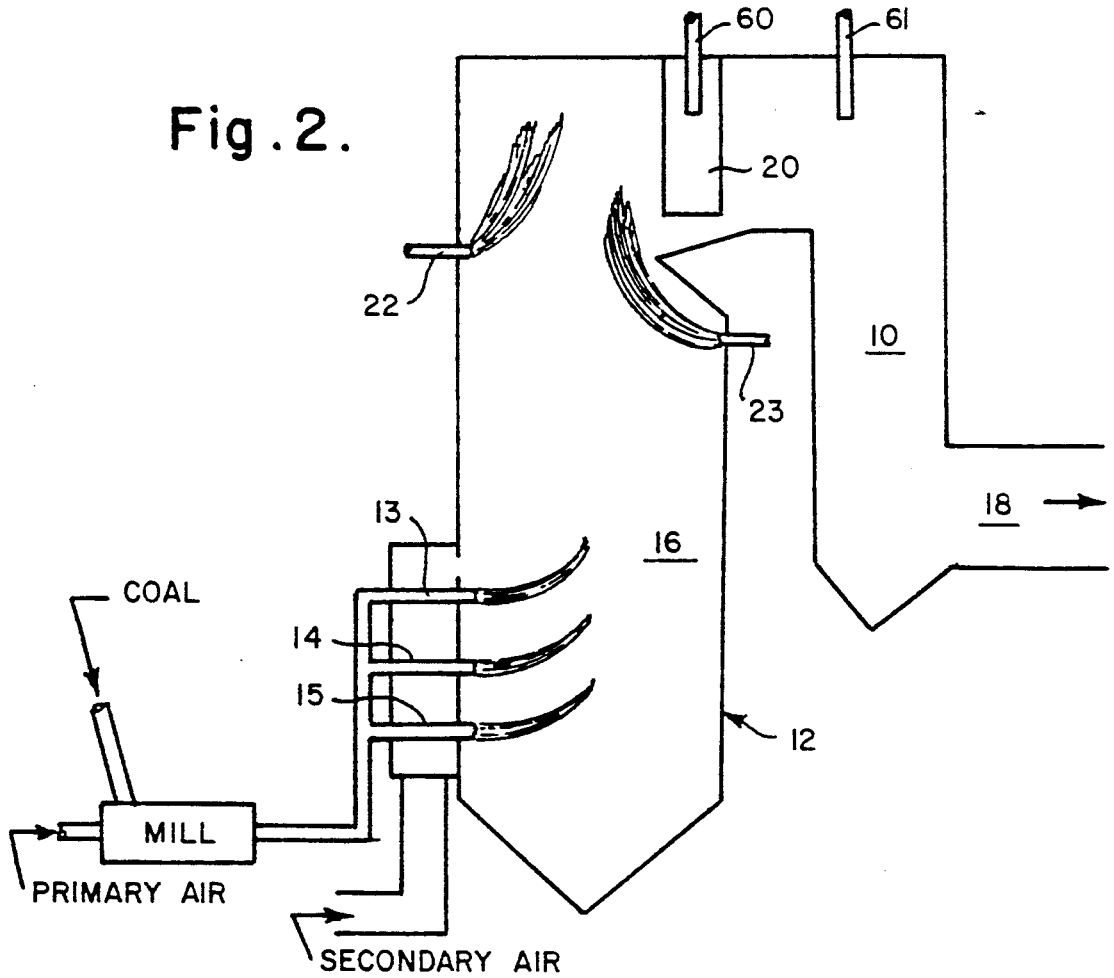
FIG. 2 is a schematic of a furnace arrangement suitable for the practice of our invention.

Our improved apparatus for reducing nitrogen oxide emissions in furnace flue gas can be readily retrofitted to an existing furnace. Our method and apparatus can be used for a wide variety of furnaces. The furnace could be a boiler, a process heater, an incinerator or the type of furnace which directly or indirectly supplies hot gases to heat materials in a process. The furnace 12 shown in FIG. 2 is designed to consume coal milled and mixed with primary air or any other fuel. The fuel enters the furnace 12 by way of fuel entries 13, 14 and 15, which are located in the bottom portion of the furnace 12. It burns in primary combustion zone 16 which typically has a temperature above 3000° F. Flue 18 provides an exit for the flue gas which is created in primary combustion zone 16 during the combustion of the fuel. The flue gas has a temperature in the range of 2100° F. to 2400° F. when it exits the furnace near heat exchangers 20. Heat exchangers 20 in the upper convective zone of the furnace cause a rapid temperature drop of the flue gas. During the combustion of the fuel, some of the fixed nitrogen reacts with oxygen to form nitrogen oxide, and $NO_x$ is formed from atmospheric nitrogen and oxygen.

We provide fuel addition apparatus 22 and 23 which are positioned above combustion zone 16 to introduce natural gas or other fuel having little or no fixed nitrogen content which flows from these diffusers into the surrounding combustion products in the upper portions of the furnace 12 above the primary combustion zone 16. Other fluid fuels which usually contain little fixed nitrogen include those of the general forms $C_x H_y$ or $C_x H_y O_z$.

Our fuel injection devices 22 and 23 may each be a pipe 30 passing through a wall of the furnace 11 as shown in FIG. 3, which can be of any convenient cross sectional shape. We may also use a pipe 31 having an annular opening 32 as shown in FIG. 4, pipes or ducts 33 having a plate 34 with orifices 35 at its discharge, as shown in FIG. 5, a nozzle 36 as shown in FIG. 6, a pipe 37 with a porous diffusion discharge section which may be metal 38 as shown in FIG. 7 or ceramic 39 as shown in FIG. 8, or a pipe 40 with a fabric sock 41 made of ceramic or fiberglass as shown in FIG. 9. The openings in the porous devices may be extremely small so that the discharge end may have from one hundred to as many as one million openings and in any case, none are larger than about ¼ inch in diameter.

Although FIGS. 3 through 9 show the injection devices perpendicular to the flue gas flow such an orientation is not essential. The injectors could be positioned at other angles relative to the flue gas flow. Indeed, one may even provide an injector which is movable so that the fuel injection angle could be changed to improve furnace operation or $NO_x$ reduction by redirecting the fuel flow.

We can also add the fuel in the first convective zone through suitable devices 60 or after the first convective zone through device 61.

As the fuel diffuses into the flue gas, it reacts with the $O_2$ to release its energy:

$$CH_4 + 2O_2 \rightarrow CO_2 + 2H_2O \qquad (1)$$

In addition, fuel fragments formed when reaction (1) is only partially complete react with $NO_x$ to reduce the nitrogen oxides.

$$CH_f + NO_x \rightarrow N_2 + CO_2 + H_2O \qquad (2)$$

These equations characterize the process but do not comprehend all reactions, pathways and intermediate species which may occur.

We introduce natural gas in the upper portion of the furnace so that it does not interfere with the primary combustion of the coal taking place in the furnace below. Because natural gas, which burns more readily and rapidly than coal, is used as the fuel, it can be introduced at a level in the furnace where the temperature is in the range of 2100° F. to 2400° F. Since this is the desired exit temperature of the flue gas from the furnace, our gas injectors 22 and 23 can be located near the furnace exit. The need for second stage air addition to the furnace 12 thus is eliminated. This lower temperature also reduces the temperature-dependent equilibrium level of nitrogen oxide and allows greater reduction of nitrogen oxide.

Our fuel injectors 22, 23, 60 or 61, do not require any air, nor, of course, air ducts to bring pressurized air up to them. Since no duct work is needed to carry the air to the upper portions of the furnace 12, this major retrofitting problem, which is especially acute for those furnaces which have no space to accommodate any duct work, has been eliminated.

The amount of fuel required to cause a large reduction in nitrogen oxide would be that which would react with about one half of the oxygen remaining in the fuel upstream of the primary burners. This amount would usually be 7 to 15% of the total fuel input.

Natural gas reduces the amount of nitrogen oxide in the flue gas in four ways. First, the natural gas does not contain any fixed nitrogen. Consequently, unlike a fuel containing fixed nitrogen, the combustion of natural gas creates very little additional nitrogen oxide. Second, the natural gas reduces the amount of nitrogen oxide in the flue gas directly by the chemical reaction set forth in equation (2) above. Third, the natural gas also reduces the amount of nitrogen oxide by consuming the excess oxygen in the flue gas. The reduction in the amount of oxygen in the flue gas reduces the equilibrium level of nitrogen oxide in the flue gas. Finally, since the natural gas is introduced at a higher level in the furnace where the temperature is lower, the equilibrium level of nitrogen oxide is lower, allowing for more complete reduction. In this manner, our injectors 22 and 23 provide effective reduction of nitrogen oxide in the combustion products.

Figure 10:
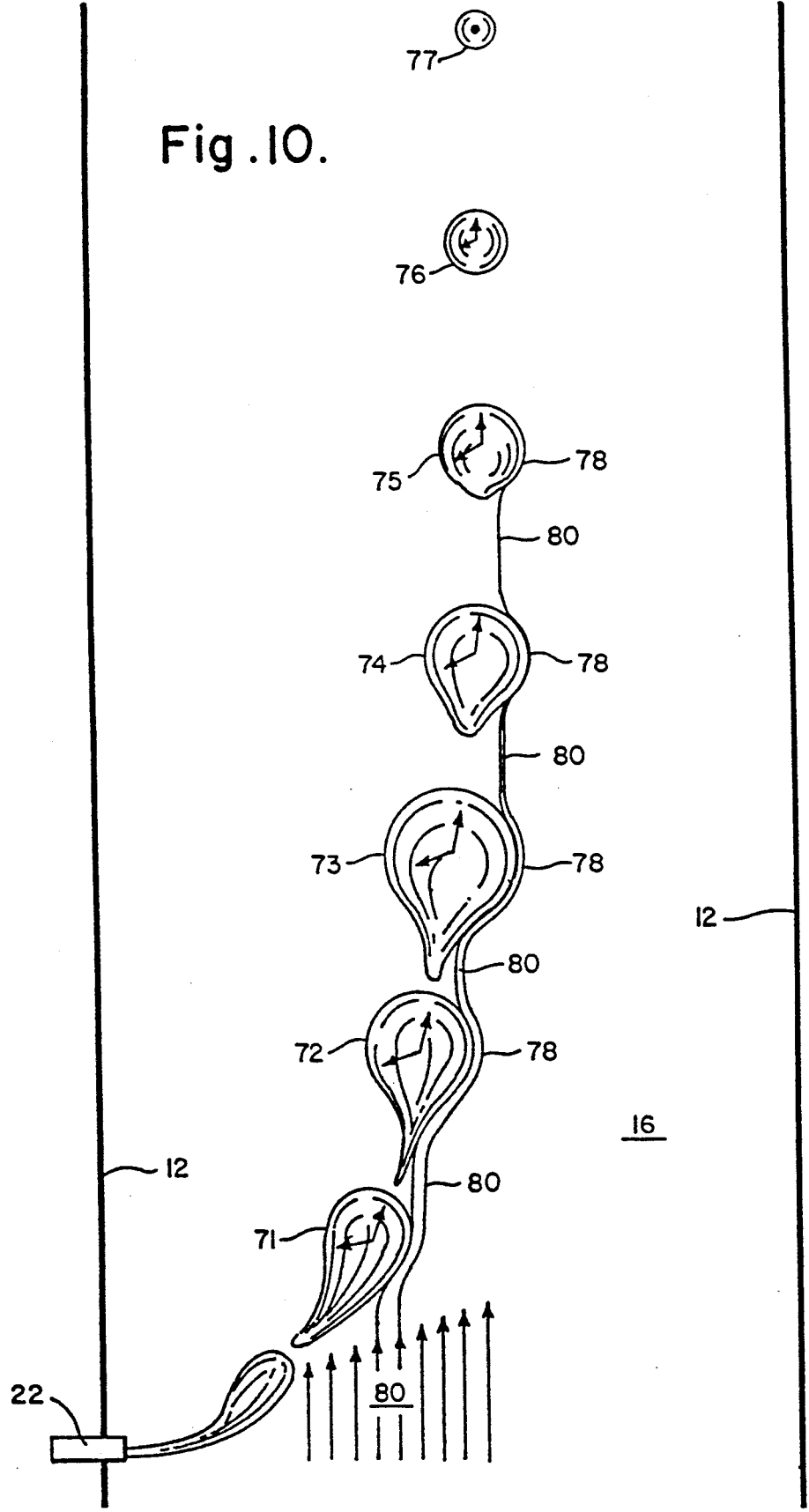
FIG. 10 is a schematic of a portion of the furnace of FIG. 2 illustrating the apparent diffusion mechanics in our method.

Although we have described the reactions which occur in our process, the mechanics are not fully understood. U.S. Pat. No. 4,779,545 teaches that natural gas must be introduced in pulses to achieve $NO_x$ reduction. We have discovered that $NO_x$ reduction can be achieved by introducing a stream of natural gas which diffuses into the flue gas. The apparent diffusion process which occurs is illustrated in FIG. 10. As the stream of gaseous fuel flows from injection device 22 it forms bulb-like masses, or diapirs 71 through 77. These diapirs expand radially as indicated by the arrows within bulbs 71 to 76. At the same time combustion occurs along the interface 78 of the diapirs with the rising flue gas indicated by arrows 80. Combustion causes a reduction in volume of the diapirs. The velocity of the diapirs which periodically detach from the injection device into the flow of the oxidant flue gas is influenced by the varying buoyancy of one gas within the other gas. The varying velocity of either gas may be controlled in flow direction or in radial dimension by the combustion process or the design of the injector body. The purpose of such injector is to produce a coherent mass of fuel floating at zero velocity in the oxidant stream so that the interface equivalent surface between reductive fuel and flue gas oxidant is smooth and unmixed (i.e. as free of turbulence as possible. Such a surface may be thought of as initially bulb-like in formation until adequately formed and then changing toward spherical as the forces of flow, temperature, viscosity specific heat and so on are influenced by combustion conditions versus consumption of fuel with oxidant which would result in a progressive diminishment in fuel volume.

In addition to providing a suitable reduction in the amount of the nitrogen oxide in the flue gas, our invention is cost-effective as a retrofit to existing coal furnaces. No additional duct work is necessary for our natural gas injectors 22 and 23. Furthermore, our fuel injectors 60 and 61 can be placed near the furnace exit and still be within a proper operating temperature. There is no need for second stage air addition to the furnace. The injectors 60 and 61 can be placed in the convective pass, especially if hydrogen is at least part of the fuel. Hydrogen extends combustion to lower CO burnout temperatures and improves final CO burnout at low temperatures. Finally, our system is so simple that it can be inexpensively applied to retrofit any fossil fuel fired furnace currently in use.

A further advantage of our invention is the use of flue gas rather than air as the oxidizer in the diffusion interface. This improvement allows a smaller amount of natural gas to be used in order to reach the desired air/fuel ratio, because no air is introduced through the fuel injectors. This improvement has the additional advantage of reducing the gas flow, per unit energy released, through the convective passes.

While we have shown and described a present preferred embodiment of the invention and have illustrated a present preferred method of practicing the same, it is to be distinctly understood that the invention is not limited thereto, but may be otherwise variously embodied and practiced within the scope of the following claims.

We claim:

1. An improved apparatus for reducing nitrogen oxide in flue gas in a combustion furnace burning at least one of coal and coke having a primary combustion zone wherein the improvement comprises:
   means forming at least one fuel introducing device attached to the furnace above the primary combustion zone which introduces into said flue gas a steady stream of fluid fuel which diffuses into said flue gas, said fluid fuel being selected from the group of fluids consisting of natural gas, hydrogen, $C_x H_y$ compounds and $C_x H_y O_z$ compounds and mixtures of said fluids.

2. The apparatus of claim 1 wherein said fuel introducing device is positioned to introduce said fuel into a region of said furnace wherein said flue gas is at a temperature in the range of 2100° F. to 2400° F.

3. The apparatus of claim 1 wherein said fuel introducing device are sized and provided in sufficient numbers to promote reaction between said fuel and said nitrogen oxide to provide a substantial reduction of said nitrogen oxide.

4. The apparatus of claim 1 wherein said fuel introducing device is a pipe.

5. The apparatus of claim 1 wherein said fuel introducing device is an annular opening.

6. The apparatus of claim 1 wherein said fuel introducing device is an orifice.

7. The apparatus of claim 1 wherein said fuel introducing device is a nozzle.

8. The apparatus of claim 1 wherein said fuel introducing device is a porous device.

9. The apparatus of claim 1 wherein said fuel is introduced through 100 to 1,000,000 holes of less than ¼ inch diameter.

10. The apparatus of claim 1 wherein said fuel is introduced through a ceramic sock.

11. The apparatus of claim 1 wherein said combustion furnace is part of a steam generator.

12. The apparatus of claim 1 wherein said combustion furnace is part of a process heater.

13. The apparatus of claim 1 wherein said combustion furnace is of the type which heats directly, or, supplies hot gases to heat directly, materials in a process.

14. The apparatus of claims 1 wherein said combustion furnace is part of a heater.

15. The apparatus of claim 1 wherein said combustion furnace is part of an incinerator.

16. An apparatus in claim 1 wherein the fuel is introduced in a direction other than horizontally.

17. An apparatus in claim 1 wherein the fuel introducing devices are capable of being reoriented so as to improve the operation by redirecting the fuel flow.

18. An improved apparatus for reducing nitrogen oxide in the flue gas in a furnace having a convective zone wherein the improvement comprises: means forming at least one-fuel introducing device in or after said convective zone which introduces into said flue gas a steady stream of fluid fuel which diffuses into said flue gas, said fluid fuel being selected from the group of fluids consisting of natural gas, hydrogen, $C_x H_y$ compounds and $C_x H_y O_z$ compounds and mixtures of said fluids.

19. The apparatus of claim 18 wherein said fuel introducing devices are sized and provided in sufficient numbers to promote the reaction between said fuel and said nitrogen oxide to provide a substantial reduction in said nitrogen oxide.

20. The apparatus of claim 18 wherein said fuel is hydrogen.

21. The apparatus of claim 18 wherein at least part of said fuel is hydrogen.

22. The apparatus of claim 18 wherein said fuel introducing device is a porous body.

23. The apparatus of claim 18 wherein said fuel inducing device includes a porous member having 100 to 1,000,000 holes of less than ¼ inch diameter.

24. The apparatus of claim 18 wherein said fuel introducing device is a ceramic sock.

25. The apparatus of claim 18 wherein said fuel introducing device is a pipe.

26. The apparatus of claim 18 wherein said fuel introducing device is an annular opening.

27. The apparatus of claim 18 wherein said fuel introducing device is an orifice.

28. The apparatus of claim 18 wherein said fuel introducing device is a nozzle.

29. The apparatus of claim 18 wherein said furnace is part of a steam generator.

30. The apparatus of claim 18 wherein said furnace is part of a heater.

31. An apparatus of claim 18 wherein the fuel is not introduced vertically.

32. An apparatus as in claim 18 wherein the fuel introducing device can be reoriented as needed.

33. An in-furnace method for reducing oxygen in flue gas comprising the step of:
   injecting a stream of fluid fuel into said flue gas so it diffuses therein, said fluid fuel being selected from the group of fluids consisting of natural gas, hydrogen, $C_x H_y$ compounds, $C_x H_y O_z$ compounds and mixtures primarily of those compounds, in sufficient quantity to promote a reaction between said nitrogen oxide in the flue gas and said fluid fuel, so as to substantially reduce said nitrogen oxide content of said flue gas.

34. The method of claim 33 wherein the fluid fuel is introduced in the upper furnace.

35. The method of claim 33 wherein said furnace has a convective zone, and wherein fluid fuel is introduced in said convective zone.

36. The method of claim 33 wherein said flue gas has a temperature within the range of 2100° F. to 2400° F.

37. The method of claim 33 wherein the fluid fuel forms diapirs of fuel moving with a flow of the flue gas as influenced by buoyancy of one gas within another and by other flow, viscous, and thermal effects so the diapirs move with the flue gas and diffusion between them is slow.

38. An improved apparatus for reducing nitrogen oxide in flue gas in a combustion furnace having a primary combustion zone wherein the improvement comprises at least one porous device for introducing fuel attached to the furnace above the primary combustion zone which introduces into said flue gas a stream of fluid fuel which diffuses into said flue gas, said fluid fuel being selected from the group of fluids consisting of natural gas, hydrogen, $C_x H_y$ compounds and $C_x H_y O_z$ compounds and mixtures of said fluids.

39. The apparatus of claim 38 wherein said fuel is introduced through 100 to 1,000,000 holes of less than ¼ inch diameter.

40. The apparatus of claim 38 wherein said fuel is introduced through a ceramic sock.

* * * * *

REEXAMINATION CERTIFICATE (3764th)

United States Patent [19]
Breen et al.

[11] B1 5,078,064
[45] Certificate Issued May 18, 1999

[54] APPARATUS AND METHOD OF LOWERING $NO_x$ EMISSIONS USING DIFFUSION PROCESSES

[75] Inventors: Bernard P. Breen; Steven E. Winberg, both of Pittsburgh, Pa.; James E. Gabrielson, Plymouth, Minn.; James C. McMichael, Monroeville, Pa.

[73] Assignee: Gas Research Institute, Chicago, Ill.

Reexamination Request:
No. 90/004,681, Jun. 26, 1997

Reexamination Certificate for:
Patent No.: 5,078,064
Issued: Jan. 7, 1992
Appl. No.: 07/623,782
Filed: Dec. 7, 1990

[51] Int. Cl.$^6$ .................................................. F23B 5/00
[52] U.S. Cl. ............................................. 110/212; 110/345
[58] Field of Search ................................. 110/212, 213, 110/214, 342, 344, 345; 422/182, 183

[56] References Cited

U.S. PATENT DOCUMENTS

| | | |
|---|---|---|
| 3,867,507 | 2/1975 | Myerson . |
| 4,372,770 | 2/1983 | Krumwiede et al. . |
| 4,810,186 | 3/1989 | Rennert et al. . |
| 4,877,590 | 10/1989 | Epperly et al. . |
| 5,020,456 | 6/1991 | Khinkis et al. . |

FOREIGN PATENT DOCUMENTS

| | | |
|---|---|---|
| 3927096 | 4/1990 | Germany . |
| 52-12670 | 1/1977 | Japan . |
| 53-26270 | 3/1978 | Japan . |
| 53-300979 | 3/1978 | Japan . |
| 53-89872 | 8/1978 | Japan . |
| 54-50471 | 4/1979 | Japan . |

OTHER PUBLICATIONS

Sakai et al., *Mitsubishi "MACT" In–furnace NOx Removal Process for Steam Generator* (*1981*).

Payne et al., *Demonstration of Gas Reburning/Sorbent Injection $NO_x/SO_2$ Control Technology on Three Utility Boilers* (1988).

Chen et al., *Bench and Pilot Scale Process Evaluation of Reburning for In–Furnace $NO_x$ Reduction* (1986).

Wendt et al., *Reduction of Sulfur Trioxide and Nitrogen Oxides by Secondary Fuel Injection* (1972).

*Primary Examiner*—John T. Kwon

[57] ABSTRACT

An apparatus and method for reducing nitrogen oxide emissions from furnace flue gas is provided in which natural gas or other fluid fuel which has little or no fixed nitrogen is introduced into the upper portion of the furnace. The fuel diffuses by laminar or turbulent diffusion into oxygen-rich flue gas where it reacts with oxygen and nitric oxide to form $CO_2$, $H_2O$ and $N_2$, thus reducing the nitrogen oxide emissions from the furnace. In this manner, the amount of nitrogen oxide in the flue gas is reduced. The apparatus and method can be easily applied to new furnaces or retrofitted on existing furnaces.

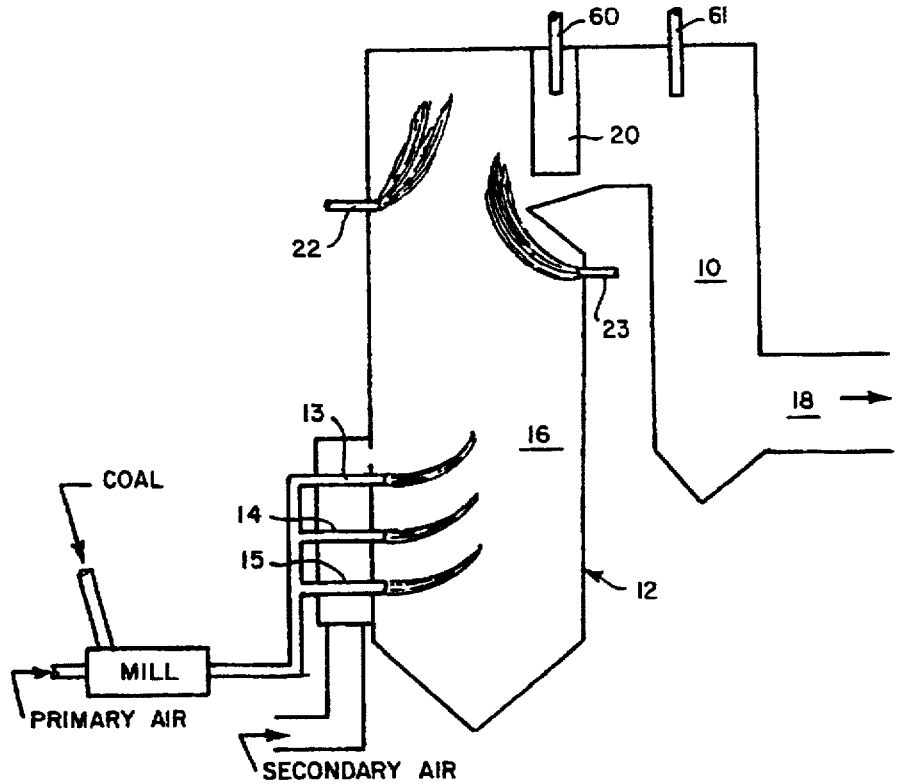

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 38–40 is confirmed.

Claims 16, 17, 31 and 32 are cancelled.

Claims 1, 18 and 33 are determined to be patentable as amended.

Claims 2–15, 19–30 and 34–37, dependent on an amended claim, are determined to be patentable.

1. An improved apparatus for reducing nitrogen oxide in flue gas in a combustion furnace burning at least one of coal and coke having a primary combustion zone wherein the improvement comprises:

means forming at least one fuel introducing device attached to the furnace above the primary combustion zone which introduces into said flue gas a steady stream of fluid fuel [which] *without adding second stage air, whereby said fluid fuel diffuses into said flue gas through natural mixing,* said fluid fuel being selected from the group of fluids consisting of natural gas, hydrogen, $C_xH_y$ compounds and $C_xH_yO_z$ compounds and mixtures of said fluids.

18. An improved apparatus for reducing nitrogen oxide in the flue gas in a furnace having a convective zone wherein the improvement comprises:

mean forming at least one-fuel introducing device in or after said convective zone which introduces into said flue gas a steady stream of fluid fuel [which] *without adding second stage air, whereby said fluid fuel diffuses into said flue gas through natural mixing,* said fluid fuel being selected from the group of fluids consisting of natural gas, hydrogen, $C_xH_y$ compounds and $C_xH_yO_z$ compounds and mixtures of said fluids.

33. An in-furnace method for reducing oxygen in flue gas comprising the step of:

injecting a stream of fluid fuel into said flue gas fuel [so it] *without adding second stage air, whereby said fluid fuel* diffuses [therein] *into said flue gas through natural mixing,* said fluid fuel being selected from the group of fluids consisting of natural gas, hydrogen, $C_xH_y$ compounds and $C_xH_yO_z$ compounds and mixtures primarily of those compounds, in sufficient quantity to promote a reaction between said nitrogen oxide in the flue gas and said fluid fuel, so as to substantially reduce said nitrogen oxide content of said flue gas.

* * * * *